Patented Mar. 19, 1929.

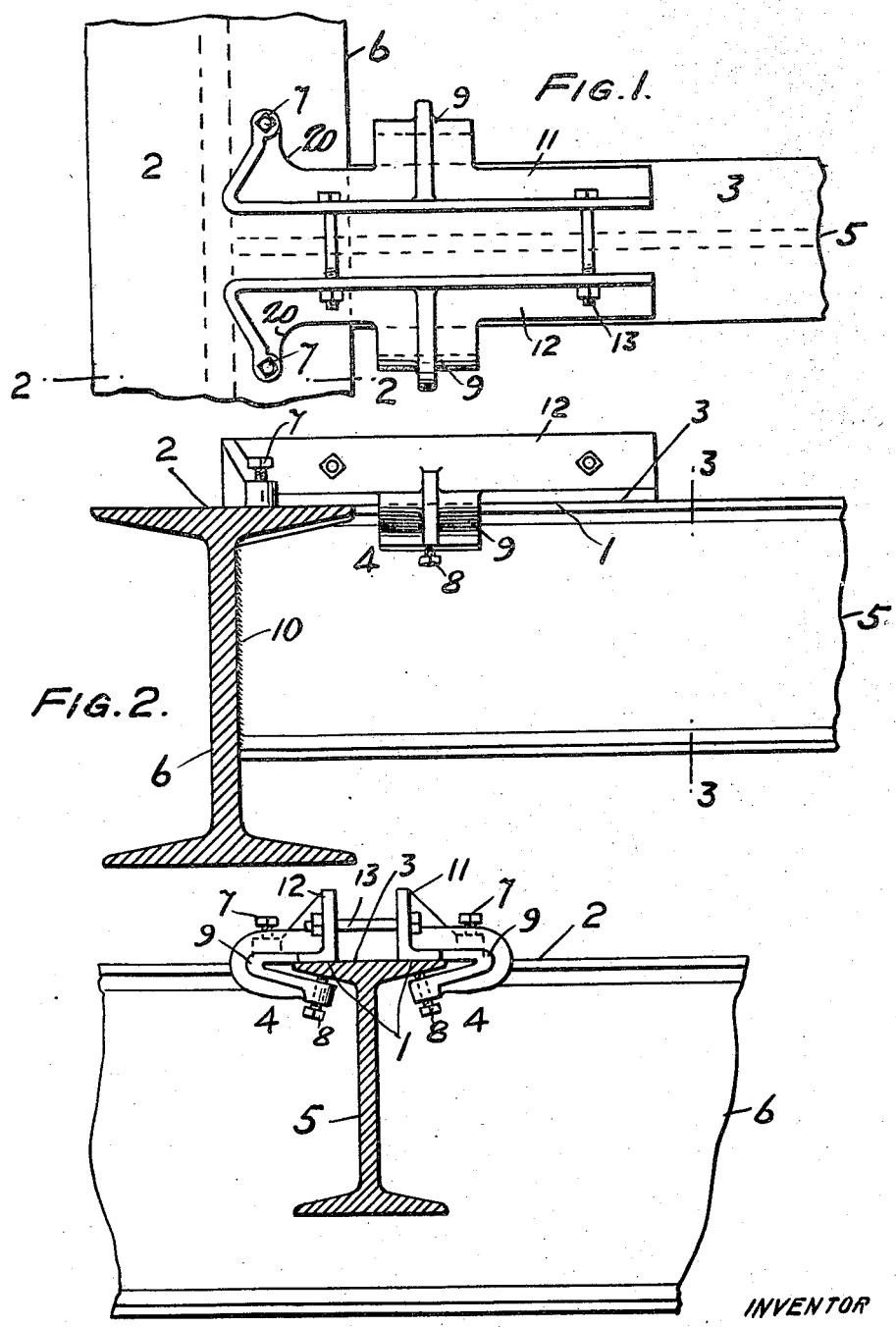

1,705,670

UNITED STATES PATENT OFFICE.

HARRY R. LENTZ, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE.

CLAMP FOR POSITIONING AND HOLDING BEAMS FOR WELDING.

Application filed November 15, 1927. Serial No. 233,341.

The principal object of the present invention is to provide for positioning structural members, such as beams, and for holding them in position during welding.

Other objects will appear from the following description at the end of which the invention will be claimed.

Generally stated, the invention comprises a clamp for positioning and holding beams consisting of two members bolted together and having at one of their ends set screws for resting upon the top of one beam and having intermediate of their lengths U-shaped jaws adapted to receive the flange of another beam and provided with set screws for bringing the top of the last mentioned beam level with the bottom surface provided on the members to constitute said ends in effect a prolongation of the top of the last mentioned beam.

The invention also comprises the improvements to be presently described and finally claimed.

In the following description reference will be made to the accompanying drawing forming part hereof and in which Figure 1 is a top or plan view of a clamp embodying features of the invention showing the same in application to a couple of floor beams.

Fig. 2 is an elevational view partly in section on the line 2—2 of Fig. 1, and

Fig. 3 is a sectional view on the line 3—3 of Fig. 2 looking toward the left.

Referring to the drawing the clamp is provided with a flat bottom surface 1 adapted to rest upon the top level surface 2 and 3 of two beams, and the clamp has spaced from one end means generally indicated at 4 for clamping the top surface 3 of one of the beams 5 against a portion of the flat surface 1 of the clamp leaving the other portion 20 of the surface 1 of the clamp free to rest upon the top surface 2 of the other beam 6. The end 20 of the clamp referred to is shown as provided with set screws 7 disposed oppositely in respect to the set screws 8 which with the jaws 9 are the means generally designated at 4. The space provided between the means 4 and the end of the clamp, which is shown as provided with set screws 7, and between the cutaway portion of the flange and top web of the beam 5, accommodates the flange of the beam 6.

The set screws 8 afford means for bringing the top 3 of the beam 5 into contact with the bottom 1 of the clamp, and the set screws 7 afford means for adjusting the top 3 of the beam 5 into line with the top 2 of the beam 6. It will be understood that when the beams are in the position shown they can be readily welded as indicated at 10, and further that they can be readily brought into that position. As shown the clamp comprises two members 11 and 12, which are similar except that one is righthanded and the other is lefthanded. These members are connected by bolts 13, and they are shown as flanged both marginally and crosswise at the jaws 9. These elements, as indicated in the drawing, are provided at one end with lateral extensions in which the set screws or bolts 7 are mounted, and in this way a wide base is provided for supporting the clamp upon the beam 6.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A clamp for positioning and holding beams for welding comprising a pair of elements having a bottom surface conforming to the top surface of a beam and having spaced from one end a pair of jaws adapted to receive the beam and provided with set screws for engaging the beam and holding the top surface of the beam in contact with said bottom surface to constitute the clamp in effect an extension of the top surface of the beam, bolts operative transversely of the elements, and set screws arranged at said ends and adapted to bear upon the top surface of another beam.

2. A clamp for positioning and holding beams for welding comprising a pair of elements having a bottom surface enlarged at one end and conforming to the top surface of a beam and having spaced from said end a pair of jaws adapted to receive the beam and provided with set screws for engaging the beam and holding the top surface of the beam in contact with said bottom surface to constitute the clamp in effect an extension of the top surface of the beam, bolts operative transversely of the elements, and set screws arranged at said enlarged end of the bottom surface and adapted to bear upon the top surface of another beam.

3. A clamp for positioning and holding beams for welding, a portion of one of said beams having the flange and a portion of the web removed, the clamp having a bottom surface conforming to the top surface of a beam and having spaced from one end means for holding the top surface of the beam in contact with said bottom surface, the space between the said end of the clamp and said means and between the portion of said beam from which the flange and part of the web have been removed being adapted to receive the flange of a second beam.

4. A clamp for positioning and holding beams for welding, a portion of one of said beams having the flange and a portion of the web removed, the clamp having a bottom surface conforming to the top surface of a beam and having spaced from one end means for holding the top surface of the beam in contact with said bottom surface, the space between the said end of the clamp and said means and between the portion of said beam from which the flange and part of the web have been removed being adapted to receive the flange of a second beam, and set screws at said end of the clamp for bringing the top of the first mentioned beam flush with the top of the last mentioned beam.

5. A clamp for positioning and holding beams for welding having a flat bottom surface adapted to rest upon the top level surfaces of two beams and having spaced from one end means for clamping the top surface of one beam against a portion of the flat bottom surface of the clamp leaving the other portion of the flat bottom surface of the clamp free to rest upon the top surface of the other beam.

6. A clamp for positioning and holding beams for welding having a flat bottom surface adapted to rest upon the top level surfaces of two beams and having spaced from one end set screws for clamping the top surface of one beam against a portion of the flat bottom surface of the clamp leaving another portion of the flat bottom surface of the clamp free to rest upon the top surface of the other beam and having additional set screws disposed oppositely in respect to the first mentioned set screws and arranged at said end for resting upon the top surface of the last mentioned beam.

HARRY R. LENTZ.